United States Patent [19]

Irwin

[11] 4,218,178
[45] Aug. 19, 1980

[54] TURBINE VANE STRUCTURE

[75] Inventor: John A. Irwin, Greenwood, Ind.

[73] Assignee: General Motors Corporation, Detroit, Mich.

[21] Appl. No.: 892,392

[22] Filed: Mar. 31, 1978

[51] Int. Cl.$^2$ .......................... F01D 5/18; F01D 9/02
[52] U.S. Cl. .................................. 415/114; 416/96 R
[58] Field of Search ............. 416/96 R, 191; 415/114, 415/115, 116, 189

[56] References Cited

U.S. PATENT DOCUMENTS

| 3,026,605 | 3/1962 | Turner | 29/156.8 |
|---|---|---|---|
| 3,075,744 | 1/1963 | Peterson | 415/115 |
| 3,172,621 | 7/1963 | Erwin | 244/44 |
| 3,443,790 | 5/1969 | Buckland | 415/115 |
| 3,446,481 | 5/1969 | Kydd | 415/116 |
| 3,515,499 | 6/1970 | Beer et al. | 416/95 |
| 3,610,769 | 10/1971 | Schwedland | 415/115 |
| 3,650,635 | 3/1972 | Wachtell et al. | 415/115 |
| 3,658,439 | 4/1972 | Kydd | 416/96 |
| 3,732,031 | 5/1973 | Bowling et al. | 416/97 |
| 4,127,358 | 11/1978 | Parkes | 416/191 |
| 4,156,582 | 5/1979 | Anderson | 416/96 R |

FOREIGN PATENT DOCUMENTS

| 2345038 | 5/1974 | Fed. Rep. of Germany | 415/115 |
|---|---|---|---|
| 1276200 | 6/1972 | United Kingdom | 416/191 |

*Primary Examiner*—Everette A. Powell, Jr.
*Assistant Examiner*—A. N. Trausch, III
*Attorney, Agent, or Firm*—J. C. Evans

[57] ABSTRACT

A liquid cooled stator blade assembly for a gas turbine engine includes an outer shroud having a pair of liquid inlets and a pair of liquid outlets supplied through a header and wherein means including tubes support the header radially outwardly of the shroud and also couple the header with the pair of liquid inlets and outlets. A pair of turbine vanes extend radially between the shroud and a vane platform to define a gas turbine motive fluid passage therebetween; and each of the vanes is cooled by an internal body casting of super alloy material with a grooved layer of highly heat conductive material that includes spaced apart flat surface trailing edges in alignment with a flat trailing edge of the casting joined to wall segments of the liner which are juxtaposed with respect to the internal casting to form an array of parallel liquid inlet passages on one side of the vane and a second plurality of parallel liquid return passages on the opposite side of the vane; and a superalloy heat and wear resistant imperforate skin covers the outer surface of the composite blade including the internal casting and the heat conductive layer; a separate trailing edge section includes an internal casting and an outer skin butt connected to the end surfaces of the internal casting and the heat conductive layer to form an easily assembled liquid cooled trailing edge section in the turbine vane.

4 Claims, 10 Drawing Figures

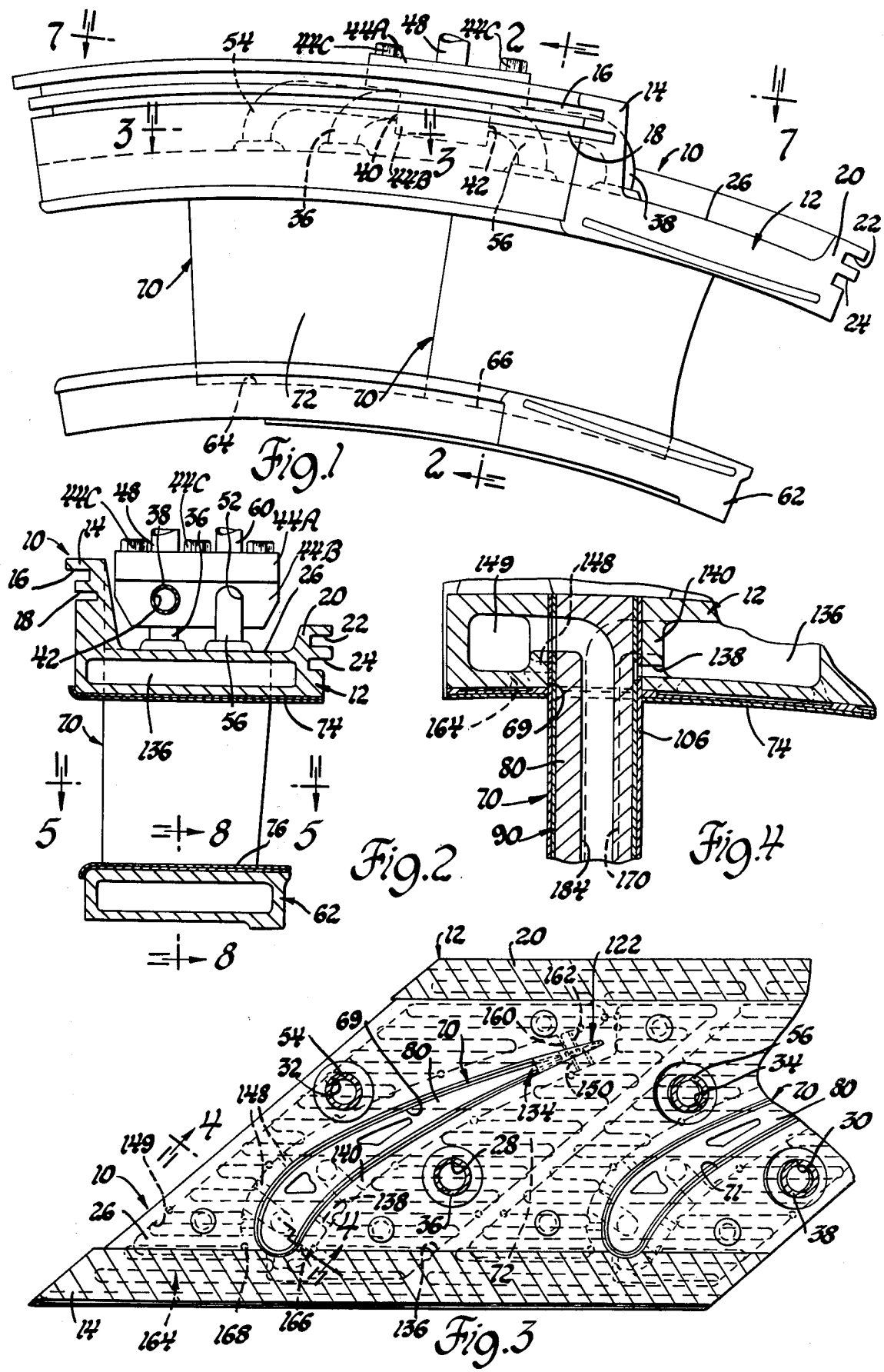

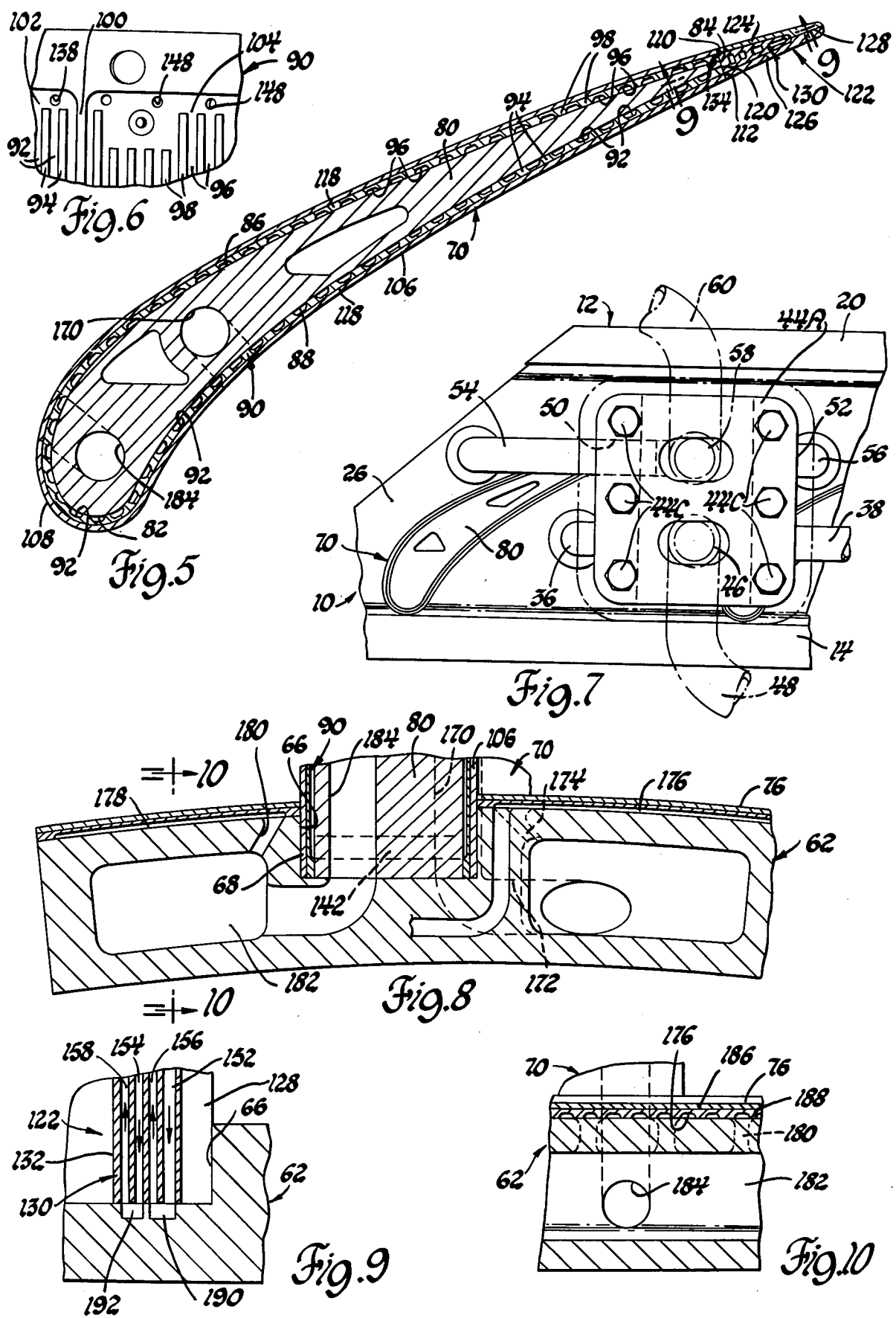

TURBINE VANE STRUCTURE

The invention herein described was made in the course of work under a contract or subcontract with Energy Research Development Administration (ERDA) of the United States Government.

This invention relates to liquid cooled turbine vane assemblies and more particularly to a liquid cooled turbine vane assembly including liquid cooled blade components therein.

Various proposals have been suggested to cool airfoil or vane components. An example of such a fluid cooled component is set forth in U.S. Pat. No. 3,172,621 issued Mar. 9, 1965, to an airfoil structure having a leading and trailing edge connected to a pump and wherein a plurality of light weight honeycomb sheets are set to receive a fluid which seeps between the individual sheets and eventually is transmitted to the outer surface of the airfoil for transpiration and film cooling thereof. The system is both intended as boundary layer control for an aircraft airfoil and for transpiration cooling at the outer surface thereof and, as such, has a perforated outer surface unsuited for use in gas turbine engine nozzle assemblies.

Another example of a fluid cooled airfoil component is set forth in U.S. Pat. No. 3,515,499 issued June 2, 1970, to Beer et al. A controlled pattern of flow passages is located in a plurality of discrete wafers bounded together to form a turbine blade. The turbine blade requires assembly of a plurality of discrete wafer elements to form passages in the blade assembly that communicate through a porous shell for cooling the outer surface of the blade. This type of system wastes liquid coolant which flows into the motive fluid.

Another hollow turbine blade with cooling passages therein is set forth in U.S. Pat. No. 3,026,605 issued Mar. 27, 1962. It shows the use of a nickel chromium cobalt alloy having drilled or electrically eroded holes filled with a leachable material formed and then removed to form coolant passages in a thin sectioned trailing edge in the high temperature resistant super alloy material of the blade assembly.

The aforesaid airfoils and vanes are merely representative of many airfoil shapes having coolant passages directed therethrough.

Additionally, prior art structures have recognized the desirability of fabricating the blade to have composite parts thereof, each fabricated from a material having either desired strength or heat resistant characteristics.

For example, in U.S. Pat. No. 3,732,031 a cooled turbine blade is set forth having a cast core of high strength covered by a porous, wrought super alloy sheet and wherein the core includes passages to transmit the cooling fluid to the sheet which has pores therein to transmit the cooling fluid to the outer face of the blade. The outer sheet is selected to be operative in a temperature range of as high as 2100° F. and has better oxidation characteristics than an all-cast structure.

Another example of a fluid cooled blade having segments of different metallurgical properties is set forth in U.S. Pat. No. 3,650,635 where the body of the airfoil is formed of a desired polycrystalline structure having equiaxed grains; in areas where it is difficult to form such crystals, such as a trailing edge, a separate part is welded to the main body at a longitudinal cut-out formed therein.

An object of the present invention is to form a water cooled assembly for use in high temperature turbine nozzle assemblies wherein multiple property vane or vane components are joined together in an optimized fashion to produce water cooling of the vanes by an arrangement wherein the dual vane ring sectors have separate coolant systems to permit selective repair of part of a turbine nozzle ring assembly.

Another object of the present invention is to provide a vane assembly as set forth in the preceding object with each vane having an imperforate outer cover and a large number of coolant passages are located immediately inboard of the imperforate cover in a structure which directly passes water into the vane assembly and which facilitates return of water from the assembly following impingement convective cooling of the vane assembly.

Still another object of the present invention is to provide an improved water cooled turbine vane ring assembly including a plurality of dual vane sectors each including a pair of vanes joined between an outer shroud and an inner vane platform to form a motive fluid passage and wherein a pair of water inlets and a pair of water outlets on the outer shroud are connected to a fluid header having an inlet fitting and an outlet fitting thereon located by means of tubes supporting the fluid header radially outwardly of the shroud while fluidly coupling the header with the pair of water inlets and outlets and wherein each of the vanes includes internal water passages and an imperforate outer cover.

Yet another object is to provide an assembly as set forth in the preceding object wherein the water passages are formed by an internal casting of high strength material having an aerodynamically configured smooth outer surface with a leading edge and continuously formed convex and concave surfaces joined to a flat butt connection surface; and further including a water distribution layer of highly conductive material with parallel grooves formed therein to communicate water inlet passages in the outer shroud to form multiple parallel inlet passages throughout the height of each of the vanes which communicate through transmission passages in the vane platform into a plurality of like parallel return passages in grooves on the opposite side of the water distribution layer and wherein a high temperature resistant impervious outer sheet covers each of the vanes and is located in close contact relationship with the outer surface of the water distribution to cool the outer surface and wherein a trailing edge assembly is joined separately to the internal casting, water distribution layer and imperforate outer sheet to form an independently water cooled trailing edge on each of the vane assemblies.

Further objects and advantages of the present invention will be apparent from the following description, reference being had to the accompanying drawings wherein a preferred embodiment of the present invention is clearly shown.

FIG. 1 is a view in perspective of a water cooled turbine nozzle sector in accordance with the present invention;

FIG. 2 is a vertical sectional view taken along the line 2—2 of FIG. 1 looking in the direction of the arrows;

FIG. 3 is a view in horizontal section taken along the line 3—3 of FIG. 1 looking in the direction of the arrows;

FIG. 4 is an enlarged fragmentary vertical sectional view taken along the line 4—4 of FIG. 3 looking in the direction of the arrows;

FIG. 5 is an enlarged, horizontal cross-sectional view taken along the line 5—5 of FIG. 2 looking in the direction of the arrows;

FIG. 6 is a developed view of a water distribution layer at the leading edge in FIG. 5;

FIG. 7 is a top elevational view of the vanes sector in FIG. 1 taken along the lines 7—7 looking in the direction of the arrows;

FIG. 8 is an enlarged fragmentary vertical sectional view taken along the lines 8—8 of FIG. 2 looking in the direction of the arrows;

FIG. 9 is a fragmentary vertical sectional view taken along the lines 9—9 of FIG. 5 looking in the direction of the arrows; and FIG. 10 is a fragmentary sectional view taken along the line 10—10 of FIG. 8.

A water cooled turbine nozzle sector 10 is illustrated in FIG. 1, it being understood that a plurality of such sector assemblies are connected in an annular ring to form the stator section of a turbine that receives motive fluid from a suitable combustor for distribution to a downstream turbine rotor. Such motive fluid is usually at an elevated temperature to produce maximum gas turbine engine efficiency and, as a result, the sector assemblies 10 preferably are fluid cooled to maintain the metal components of the turbine vane assembly within desired operating temperature ranges.

In the illustrated arrangement, each of the turbine sector assemblies 10 includes an outer annular shroud 12 that includes an upstream flange 14 thereon with a plurality of undercut connection grooves 16, 18 therein to receive flanges on an associated turbine casing for holding the nozzle sectors 10 in place. Likewise, the outer shroud 12 includes an aft flange 20 thereon with a pair of connection groove 22, 24 formed throughout the length of the aft flange for connection to casing components of a turbine.

The annular shroud 12 includes a outboard depression 26 thereon. A first pair of water inlets 28, 30 and a second pair of water return outlets 32, 34 are located at spaced points on the depression.

The water inlets 28, 32 are connected by tubes 36, 38 to opposite end openings 40, 42 formed in a fluid header 44 that includes a water inlet fitting 46 thereon in communication with a water supply tube 48 that is shown in FIG. 7. The header 44 further includes a pair of water return openings 50, 52 on opposite sides thereof that are communicated by bent tubes 54, 56 to the water return outlets 32, 34. The transfer block or header 44 has a water outlet fitting 58 thereon which is in communication with a return conduit 60 adapted to be connected to a suitable sump for the liquid coolant circuit. A suitable accessory pump circulates water through the sector assembly 10. Each sector assembly 10 thereby has a separately contained coolant circuit and as a result each individual sector can be separately replaced in a nozzle ring.

The bent tubes 48 and 60 support header portion 44A in a radially spaced relationship with respect to the engine outer casing. The two header portions 44A and 44B are sealingly clamped together by six bolts 44C. This arrangement permits assembly of the removable vane and header assembly 44B with the fixed case and header assembly portion 44A.

The sector assembly 10 further includes a radially inwardly located vane platform 62 with aero-dynamically configured support holes 64, 66 formed therein to receive the base 68 of a composite liquid cooled vane 70. See FIG. 8. Likewise, each shroud 12 has support holes 69, 71 therein to receive the opposite end of each vane 70. See FIG. 4. Each of the vanes 70 is spaced circumferentially of one another and together defines a motive fluid passage 72 having a configuration to direct motive fluid from upstream of the sector assembly 10 into a desired relationship with the inlet of a gas turbine rotor located downstream of each of the sector assemblies 10.

The annular shroud 12 includes an inboard facing cover layer 74 of heat resistant material and the blade platform likewise includes an inboard facing cover layer 76 of like heat resistant material.

As best shown in FIGS. 4 and 8, each of the cover layers 74, 76 are fit in close proximity to the outer surface of the vanes 70 along their outer perimeter to laterally seal passage 72.

Each of the vanes 70 is held in place vertically throughout the space between the platform 62 and the shroud 12 and are completely sealed thereby at their perimeters to prevent leakage from the passages 72.

Each of the composite vanes 70 more particularly includes a central core made up of a nickel alloy casting 80 having a leading edge 82 and a flat surfaced trailing edge 84 joined by convex and concave outer surfaces 86, 88 thereof. The composite vanes 70 further include a fluid distribution layer 90 of highly heat conductive substantially all nickel material such as alloy 300 of International Nickel Company. The layer 90 includes a continuously formed plurality of parallel grooves 92 illustrated in FIG. 5 with lands 94 formed therebetween located in juxtaposed relationship with the concave surface 88. On the opposite side of the vane 70 the fluid distribution layer 90 includes a plurality of parallel grooves 96 therein with interposed lands 98, each located in juxtaposed relationship with the convex surface 86 to form a water return system on the opposite side of each of the vanes 70.

The boundary line between the water distribution inlet system and the water return system is shown in FIG. 6 as a divider land 100 in the fluid distributing layer 90 that separates a water inlet side 102 from a water return side 104.

Additionally, the composite vanes 70 each include an outer cover 106 of high temperature resistant material such as IN625 superalloy material. The outer cover 106 includes a leading edge 108 and a pair of flat trailing edges 110, 112. The cover 106 is located in close juxtaposed relationship to the outer surface 118 of the fluid distribution layer 90 as best shown in FIG. 5.

One feature of the present arrangement is that the sheets forming the fluid distribution layer 90 and the heat resistant outer cover 106 are diffusion bonded together to form a flat end surface 120 that defines a butt connected surface for a prefabricated trailing edge unit 122.

More particularly, the trailing edge 122 includes a convexly formed half 124 joined at a split line to a concavely formed half 126 along a split line 128. The halves 124, 126 enclose a high conductivity internal core 130 that includes a flat surface 132 and with the halves 124, 126 defines a second flat connection surface 134 on the separately fabricated trailing edge 122 that is readily bonded by means of brazing to the previously defined end surface 120.

Each vane assembly 70 has a first liquid cooling circuit therethrough formed by the fluid distribution layer 90 and further includes a second cooling circuit through the trailing edge 122.

More particularly, the liquid cooling circuit for the main part of the vane 70 includes a passage 136 in the shroud 12 that communicates with a plurality of supply ports 138 formed in a ledge 140 that extends through the concave surface of the blade 70 at the support opening 69 therein. These features are best shown in FIGS. 4 and 6. The ports 138 are directed into the inlet side 102 for distribution downward through the plurality of parallel vertically directed grooves 92. The water flows downwardly across the concave side of each of the vanes 70 through a plurality of crossover passages 142, one of which is shown in FIG. 8. The crossover passages communicate the water inlet side 102 with the water return side 104.

The crossover passages 142 communicate with the plurality of vertically directed parallel grooves 96 in the opposite side of the fluid distribution layer 90 located in overlying relationship to the convex surface 86 of the internal core 80. The parallel grooves 96 flow into the previously designated water return side 104 and thence through ports 148 that are communicated with a passage 149 to the water return outlets 32, 34 in the shroud 12 from whence they are returned by the tubes 54, 56 to the outlet 58.

The fluid circuit in the trailing edge 122 includes water inlet passages shown at 150 in FIG. 3. Passages 150 communicate with a pair of vertically directed downflow openings 152, 154 in the tip core 130. Return flow is through a second pair of openings 156, 158 in the core 130 that communicate with side ports 160, 162 as shown in FIG. 3 that flow into the return passage 149 within the shroud 12.

Shroud cover 74 is cooled by a plurality of water passes 164 in shroud 12 as seen in FIGS. 3 and 4. Each pass has an inlet 166 and an outlet 168 in communication with passages 136, 149, respectively.

In addition, the vane assembly 10 includes a port for transferring water from the shroud 12 into the platform 62. More particularly, this water circuit is shown partially in FIG. 4 as including a vertical riser opening 170 that communicates the water inlets with an opening 172 in the platform 62. A side branch 174 from opening 172 leads to shallow coolant passes 176 like passes 164 in shroud 12. Each pass 176 is beneath the protective layer 76 on the platform for cooling the surface of the platform that is exposed to motive fluid being directed through the passages 72. A return system includes a shallow passage 178 that communicates through an inclined passage 180 in the platform 62 that communicates with an opening 182 in the platform 62 for collecting water which is then directed through a return riser opening 184 in the core 80 to be returned to the outlets 32, 34. More particularly, with reference to FIG. 10, the protective layer 76 includes an outer layer of high temperature resistant material 186 and an internal layer 188 which includes the shallow passages which are formed in passes 176 to communicate across the full planar extent of the motive fluid exposed surface of the platform.

The water flow pattern in the circuit for cooling the trailing edge section 122 is better shown in FIG. 9 which is an enlarged cross sectional view taken through the trailing edge section of the blade in FIG. 5. The water inlet passage 154 flows downwardly as shown by the arrow and communicates with a crossover passage 190 in the platform 62 to return water into the upwardly directed return passage 156. The water passage 152 has water flowing downwardly therethrough as shown in FIG. 9 to a crossover passage 192 that communicates in turn with passage 158.

By virtue of the aforesaid arrangement, all flat imperforate surfaces of the vane assembly which are exposed to motive fluid also are in contact with a sublayer having a liquid distribution network therein to readily extract heat from the vane structure so that the metal components thereof are adequately cooled during gas turbine engine operation. In the illustrated arrangement the outer skin is of impervious sheet material and has substantial thermal erosion resistance at elevated temperature conditions found in gas turbine operation.

Each of the fluid circuits is maintained as a separate circuit within given ones of a plurality of joined sectors and having the illustrated two vanes 70 thereon. This assures maintenance of cooling throughout the full ring extent of the total gas turbine engine nozzle assembly. Moreover, each of the separate, isolated fluid circuits in the sectors 10 can be separately replaced if blockage or reduced cooling effectiveness is noted in one of the component parts making up the nozzle assembly.

While the embodiments of the present invention, as herein disclosed, constitute a preferred form, it is to be understood that other forms might be adopted.

The embodiments of the invention in which an exclusive property or privilege is claimed are defined as follows:

1. A water cooled turbine nozzle vane removable sector assembly comprising: an outer shroud adapted to be removably supported on a turbine case and having a water inlet pair and a water outlet pair, a fluid header with water inlet and outlet means thereon, means including tubes supporting said fluid header radially outwardly of said outer shroud and to fluidly and directly mechanically couple said header with said water inlet pair and said water outlet pair whereby the fluid header is removable from a turbine case as part of the sector assembly, a vane platform located in spaced relationship to said shroud, a pair of turbine vanes extending radially between said shroud and said platform to form a gas turbine motive fluid passage therethrough, means for connecting each of said vanes to said shroud and said platform to laterally seal said motive fluid passage between said turbine vanes, each of said vanes including an internal core having an aerodynamically configured smooth outer surface with a leading edge and continuously formed convex and concave surfaces, said core further including a trailing edge, a layer of highly heat conductive material in juxtaposed relationship with said convex and concave walls of said core, said layer having a first plurality of grooved passages in sealed contact with said concave surface to form multiple water inlet passages on one side of said vane, said layer having a second plurality of grooved passages in sealed contact with said convex surface to form multiple water return passages, means for communicating said inlet passages and said return passages with said water inlet pair and said water outlet pair on said shroud, and a super alloy heat resistant outer cover overlying said layer of highly heat conductive material in conductive heat transfer contact with the full planar extent of the outer surface of said layer to direct heat from said cover to water flowing through said grooved passages.

2. A water cooled turbine nozzle vane removable sector assembly comprising: an outer shroud having a water inlet pair and a water outlet pair, a fluid header with a water inlet and outlet means thereon, means including tubes supporting said fluid header radially outwardly of said shroud and to fluidly couple said header with said water inlet pair and said water outlet pair, a vane platform located in spaced relationship to said shroud, a pair of turbine vanes extending radially between said shroud and said platform to form a gas turbine motive fluid passage therethrough, means for connecting each of said vanes to said shroud and said platform to laterally seal said motive fluid passage between said turbine vanes, each of said vanes including an internal core having an aerodynamically configured smooth outer surface with a leading edge and continuously formed convex and concave surfaces, said core further including a trailing edge having a flat connection surface thereacross extending throughout the vertical height of said trailing edge, a layer of highly heat conductive material including spaced apart flat surfaced trailing edges in alignment with said connection surface and wall segments in juxtaposed relationship with said convex and concave walls, said layer having a first plurality of grooved passages in one of the wall segments thereof in sealed contact with said concave surface to form multiple water inlet passages on one side of said vane, said layer having a second plurality of grooved passages in the wall segment thereon in sealed contact with said convex surface to form multiple water return passages on the opposite side of said vane, a super alloy heat resistant cover overlying said layer of highly heat conductive material in conductive heat transfer contact with the full planar extent of the outer surface of said layer to direct heat from said cover to water flowing through said grooved passages, and a separate trailing edge assembly including a flat surface thereon fixedly secured to the connection surface and flow passages formed through said trailing edge assembly and being in communication with said water inlet pair and water outlet pair for cooling outer wall portions of said trailing edge assembly at the end of each of said vanes.

3. A water cooled turbine nozzle vane assembly comprising: an outer shroud having a water inlet and a water outlet, a vane platform located in spaced relationship to said outer shroud, a vane extending radially between said outer shroud and said vane platform to form part of a gas turbine motive fluid passage therethrough and having opposite vane ends, means for connecting said vane ends to said outer shroud and said platform to seal said motive fluid passage at said vane ends, said vane including an internal core having an aerodynamically configured smooth outer surface with a leading edge and continuously formed convex and concave surfaces, a layer of highly heat conductive material with an inner surface in juxtaposed sealed relationship with said convex and concave surfaces of said core, said layer having a smooth outer surface and further having a first plurality of grooves in its inner surface facing said concave surface to form multiple water inlet passages across substantially the full planar extent of said concave surface, said layer having a second plurality of grooves in its inner surface facing said convex surface to form multiple water return passages across substantially the full planar extent of said convex surface, said layer having a smooth continuously formed outer surface, means for communicating said multiple water inlet passages and said multiple water return passages with said water inlet and said water outlet on said outer shroud for flow of inlet water from said outer shroud thence to said vane platform and for counterflow of return water from said vane platform to said outer shroud, and a super alloy heat resistant cover overlying the smooth outer surface of said layer of highly heat conductive material in conductive heat transfer contact with the full planar extent of the outer surface thereof to direct heat from said cover to water flowing through said multiple water inlet and return passages.

4. A water cooled turbine vane assembly comprising: an outer shroud having a water inlet and a water outlet, a vane platform located in spaced relationship to said shroud, a vane extending radially between said outer shroud and said platform to form part of a gas turbine motive fluid passage therethrough and having opposite vane ends, means for connecting said vane ends to said outer shroud and said platform to seal said motive fluid passage at said vane ends, said vane including an internal core having an aerodynamically configured smooth outer surface with a leading edge and continuously formed convex and concave surfaces, said core further including a trailing section having a flat connection surface thereacross extending throughout the vertical height of said trailing section, a layer of highly heat conductive material including spaced apart flat surfaced trailing segments in alignment with said connection surface, said layer further having wall segments in juxtaposed relationship with said convex and concave surfaces, said layer having a first plurality of grooved passages in one of the wall segments thereof in sealed contact with said concave surface to form multiple water inlet passages across the full planar extent of said concave surface, said layer having a second plurality of grooved passages in the wall segment thereon in sealed contact with said convex surface to form multiple water return passages on the opposite side of said vane across the full planar extent of said convex surface, a super alloy heat resistant cover overlying said layer of highly heat conductive material in conductive heat transfer contact with the full planar extent of the outer surface of said layer to direct heat from said vane for transfer to water flowing through said ground passages, and a separate trailing edge assembly including a flat surface thereon fixedly secured to the connection surface and said flat surfaced trailing segments, and means forming coolant flow passages through said trailing edge assembly and being in communication with said water inlet and water outlet for cooling said trailing edge assembly.

* * * * *